United States Patent

Hsu

[11] Patent Number: 6,131,844
[45] Date of Patent: Oct. 17, 2000

[54] TAPE RULE BLADE ARRESTOR DEVICE

[76] Inventor: Cheng-Hui Hsu, No. 126, Pad Chung Road, Hsin Tien City, Taipei Hsien, Taiwan

[21] Appl. No.: 09/283,328

[22] Filed: Mar. 31, 1999

[51] Int. Cl.[7] .............................. B65H 75/48; G01B 3/10
[52] U.S. Cl. .............................................. 242/380; 33/761
[58] Field of Search .............................. 242/380; 33/761, 33/762, 763, 764, 765, 766, 767, 768, 769; D10/72

[56] References Cited

U.S. PATENT DOCUMENTS

| | | | |
|---|---|---|---|
| 4,153,996 | 5/1979 | Rutty | 33/767 |
| 4,479,617 | 10/1984 | Edwards | 242/380 |
| 5,395,069 | 3/1995 | Chen | 33/767 |
| 5,531,395 | 7/1996 | Hsu | 33/767 |
| 5,791,581 | 8/1998 | Loeffler et al. | 242/380 |

*Primary Examiner*—John M. Jillions
*Attorney, Agent, or Firm*—Pro-Techtor International Services

[57] ABSTRACT

A tape rule blade arrestor device of the invention herein is comprised of a right case half, a left case half, a bumper block, a tape reel, and other components that provides an improved structure for the rewinding of the tape rule blade having the capability to enhance cushioning and arresting performance to prevent the enormous shearing stress generated by excessive rewinding speed, and thereby increasing tape rule service life and safety.

1 Claim, 7 Drawing Sheets

TAPE RULE BLADE ARRESTOR DEVICE

BACKGROUND OF THE INVENTION

1) Field of the Invention

The invention herein relates to a tape rule blade arrestor device that provides an improved structure for the rewinding of the tape rule blade having the capability to enhance cushioning and arresting performance to prevent the generation of enormous shearing stress by excessive rewinding speed, and thereby increase tape rule service life and utilization safety.

2) Background of the Prior Art

Referring to FIG. 1 and FIG. 2, a conventional tape rule 10 is comprised of a tape reel 13 that consists of a tensile center-wound spiral spring 131 at the interior section, a ruler blade 132 wound on the exterior section, and a hook 133 riveted to the front end of the ruler blade 132; the center section of the spiral spring 131 on the tape reel 13 is inserted over the center shaft 122 of the left case half 12; and the front end of the ruler blade 132 is positioned in the bumper block 14, which is secured inside the insertion slot 121 at the bottom section and front end of the left case half 12, with the other side of the said bumper block 14 secured inside the insertion slot 34 at the bottom section and front end of the right case half 11; and one each of the three screws 15 is inserted into the screw holes 111, 112, and 113 in the said right case half 11 and then fastened tightly into the center shaft 122 and the mounting posts 123 and 124 of the left case half 12 to complete the assembly of the tape rule 10. The conventional product is utilized by pulling out the ruler blade 10 to an appropriate length during a measurement operation and then releasing the hook 133 when measuring is finished. Since the tension of the spiral spring 131 (similar to the type utilized in most spring mechanisms) inside increases in proportion to the length unwound and, therefore, the rewinding speed is faster when the length is greater, if the said ruler blade 132 is constructed of metal, the user is susceptible to cutaneous injuries of the hand, which is an inconvenient shortcoming of the conventional product. Furthermore, if the rewinding speed is too rapid, the force of impact against the bumper block 14 is intensified, the poor cushioning performance by the structure of the bumper block 14 often leads to the dislodging of the hook 133, a serious shortcoming that preludes further utilization. However, to innovate a more practical and convenient tape rule, the inventor of the invention herein conducted exhaustive research and development based on many years of professional manufacturing experience and, furthermore, subjected the results to extensive testing and further refinement to achieve an even higher level of practical value, which finally culminated in the tape rule blade arrestor device of the invention herein.

SUMMARY OF THE INVENTION

Therefore, the primary objective of the invention herein is to provide a tape rule blade arrestor device that enhances cushioning and arresting performance and also reduce the impact force of rewinding to thereby increase tape rule service life and utilization safety.

To enable the examination committee to further understand the structural features and technological content as well as the advantages and innovations of the invention herein, the brief description of the drawings below is followed by the detailed description of the invention herein.

DETAILED DESCRIPTION OF THE INVENTION

Figure 1:
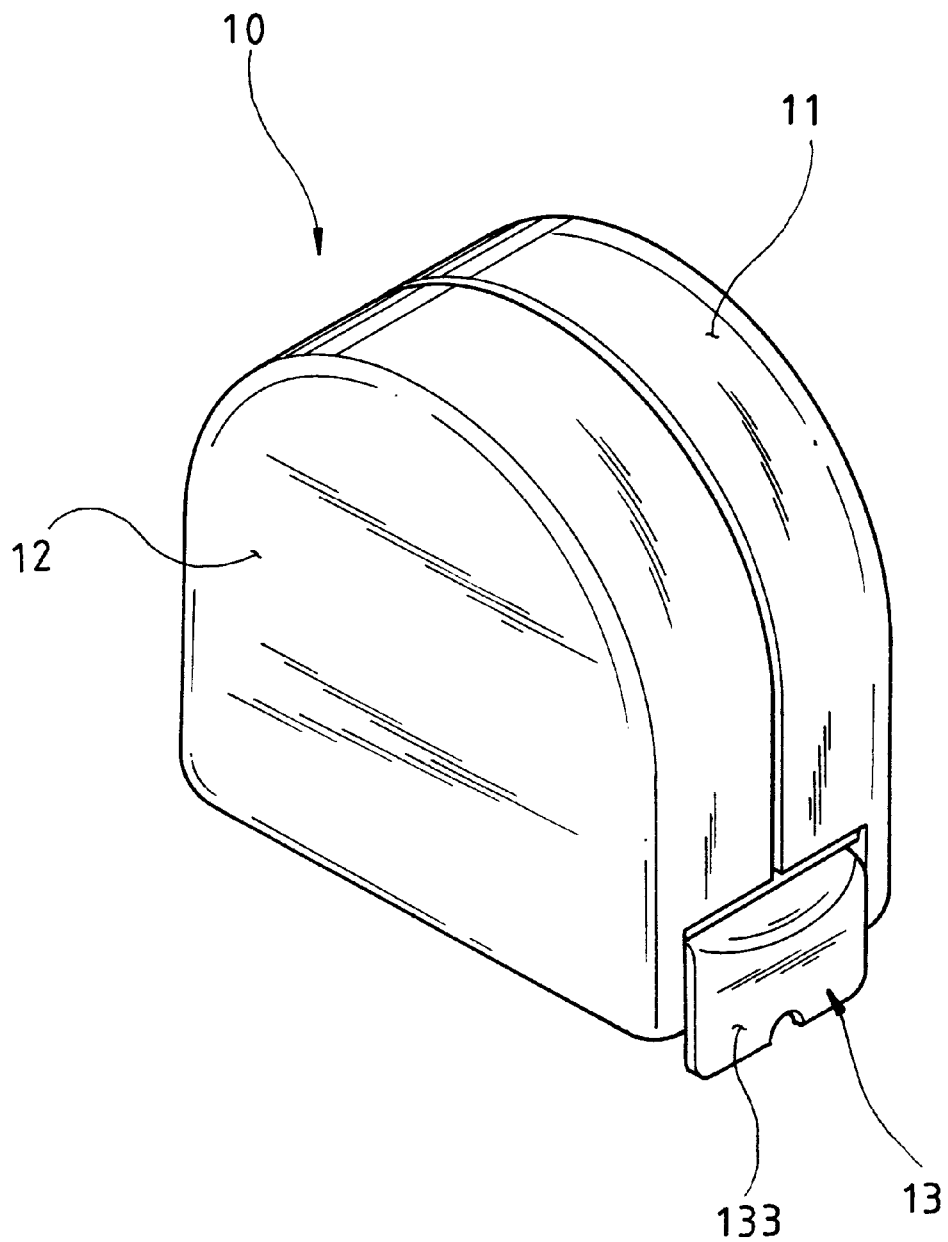
FIG. 1 is an isometric drawing of a conventional product.
Figure 2:
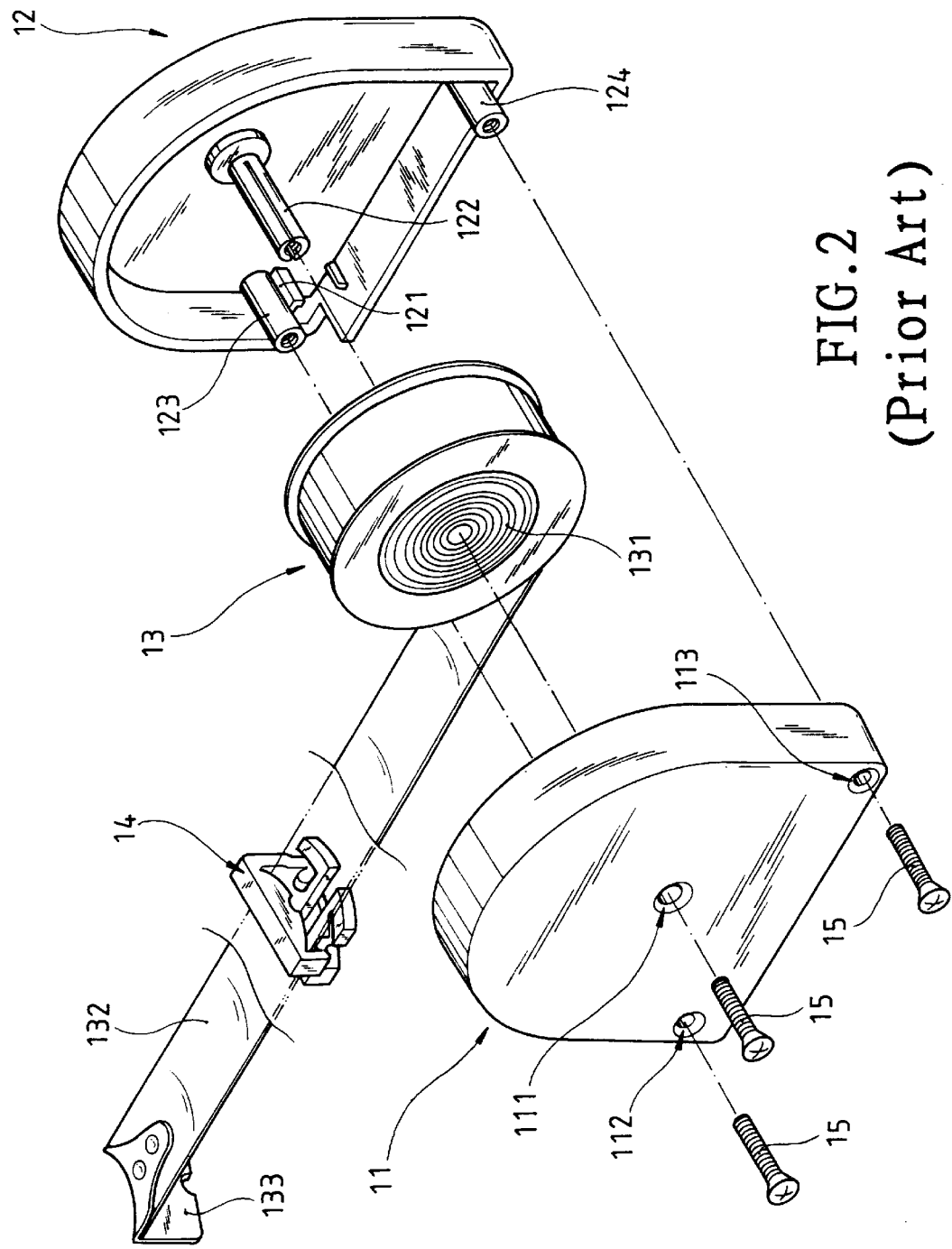
FIG. 2 is an isometric exploded drawing of a conventional product.
Figure 3:
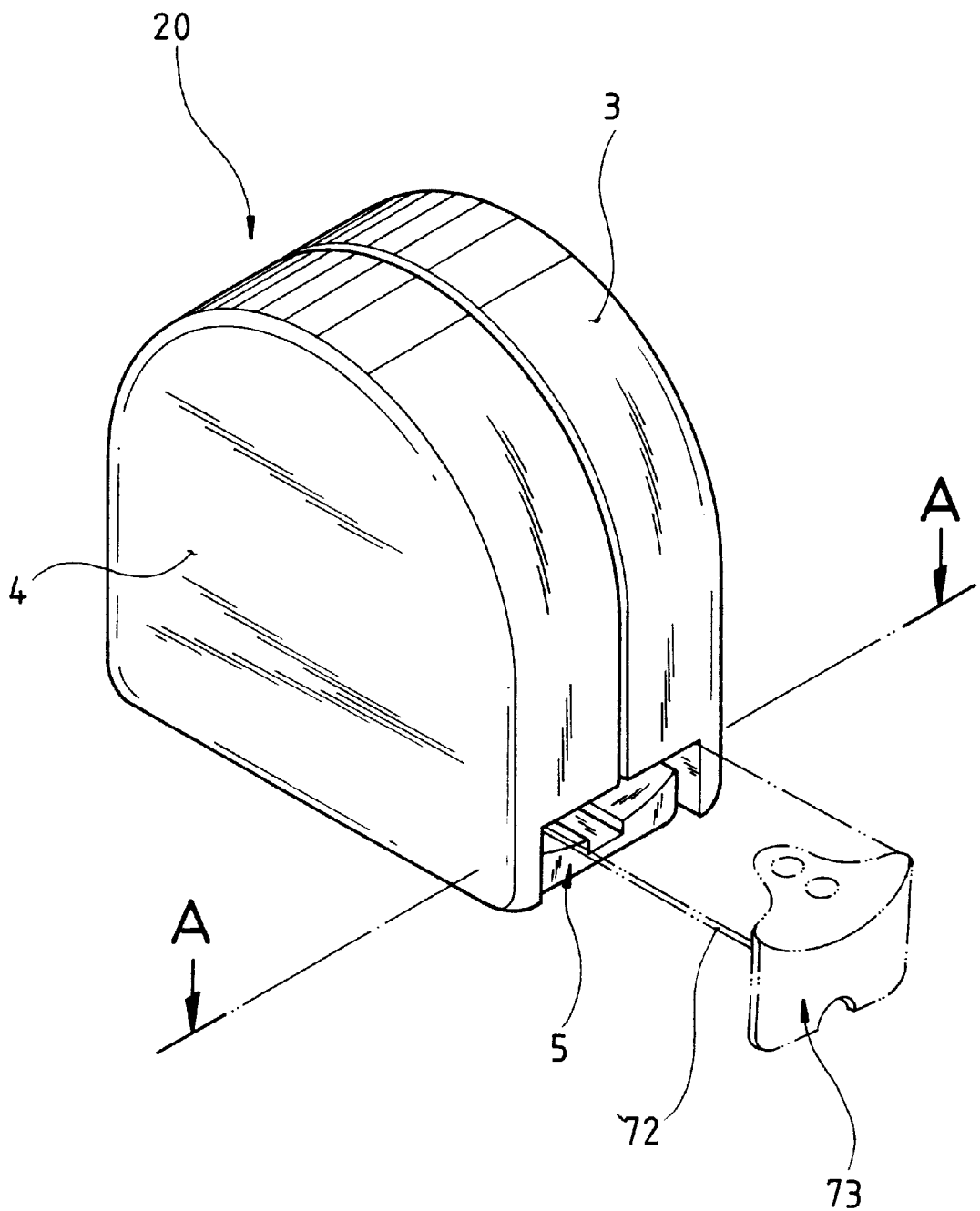
FIG. 3 is an isometric drawing of the invention herein.
Figure 4:
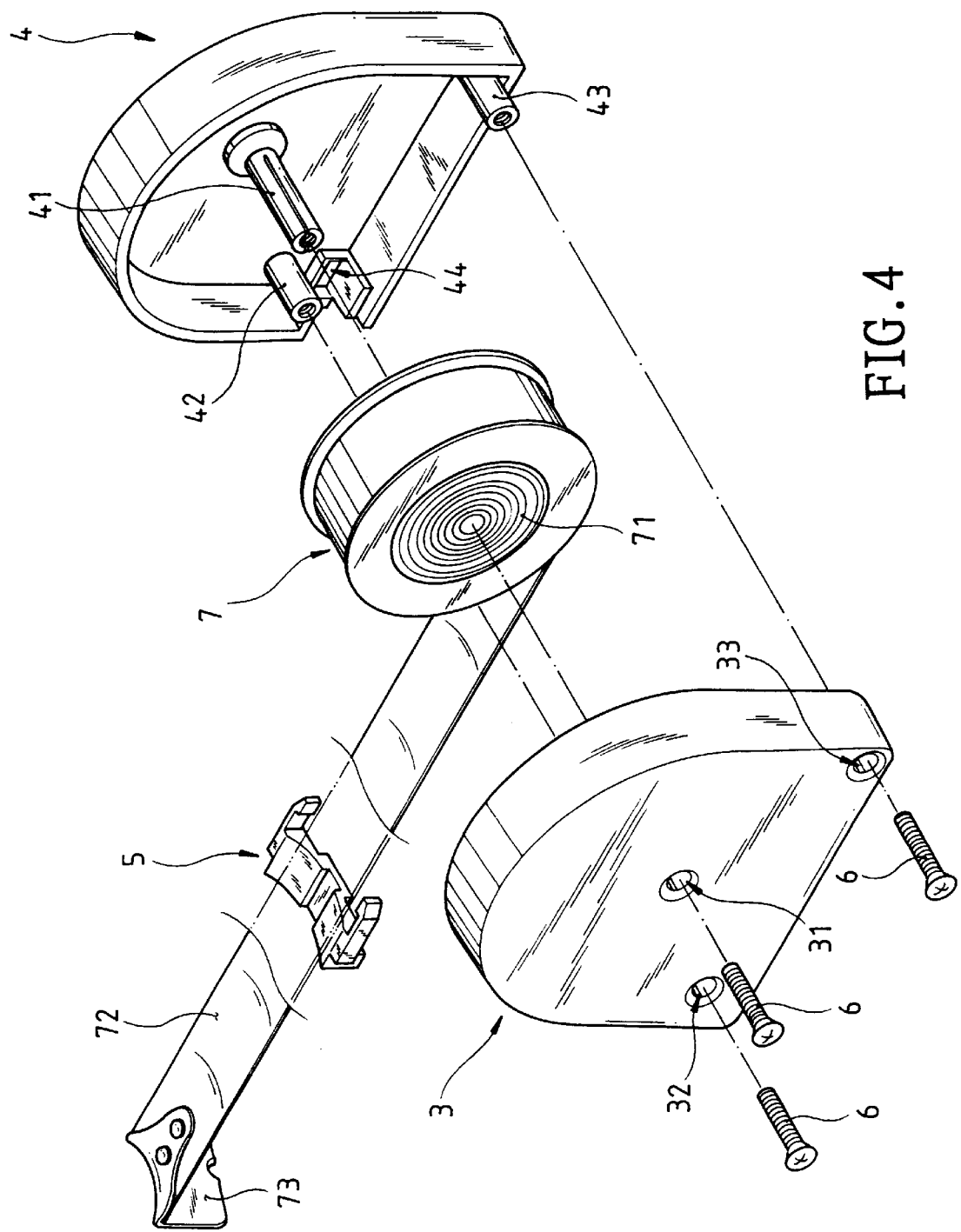
FIG. 4 is an isometric exploded drawing of the invention herein.
Figure 6:
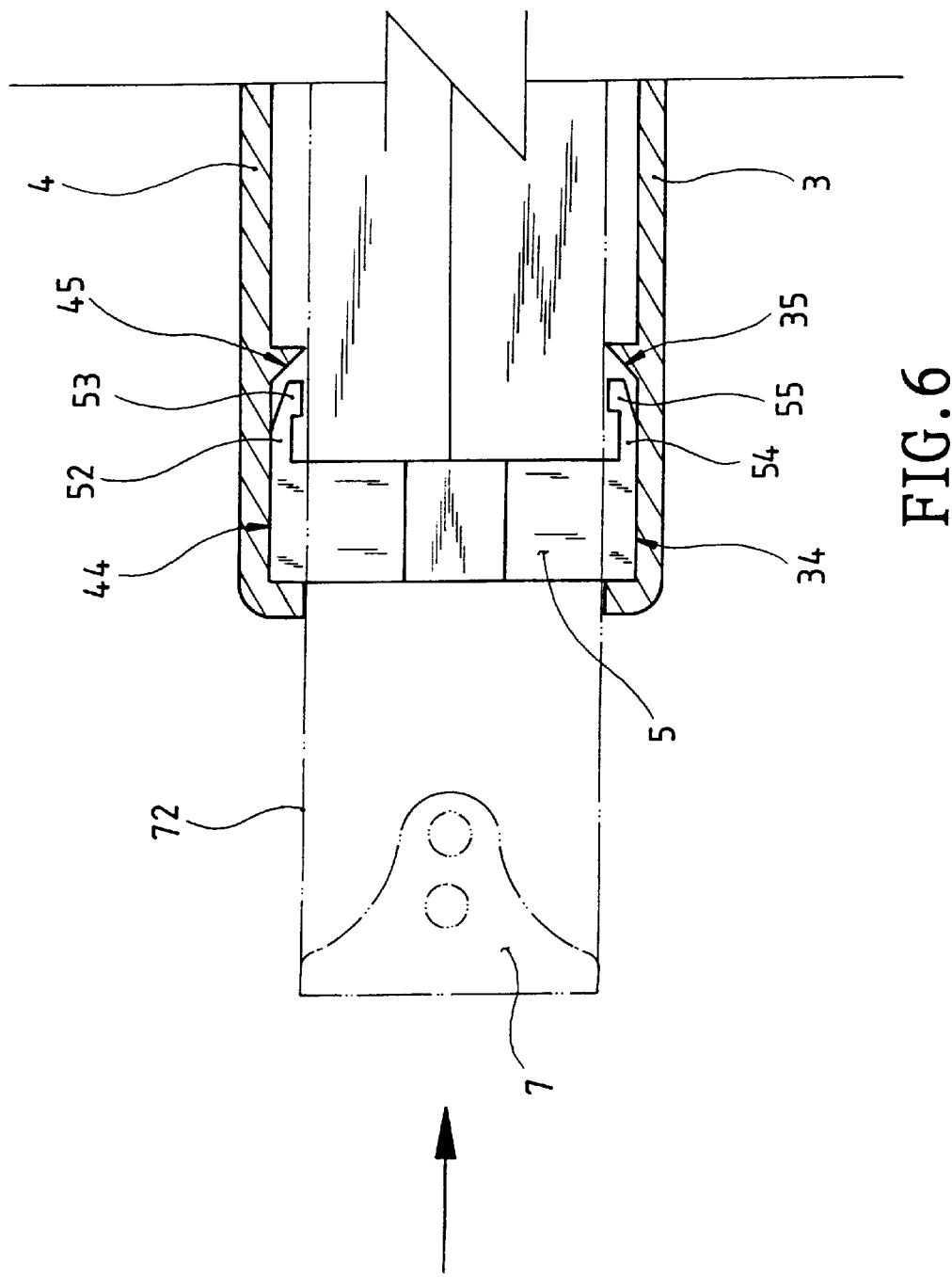
FIG. 6 and FIG. 7 are cross-sectional drawings of the invention herein illustrating an operational embodiment.
Figure 7:
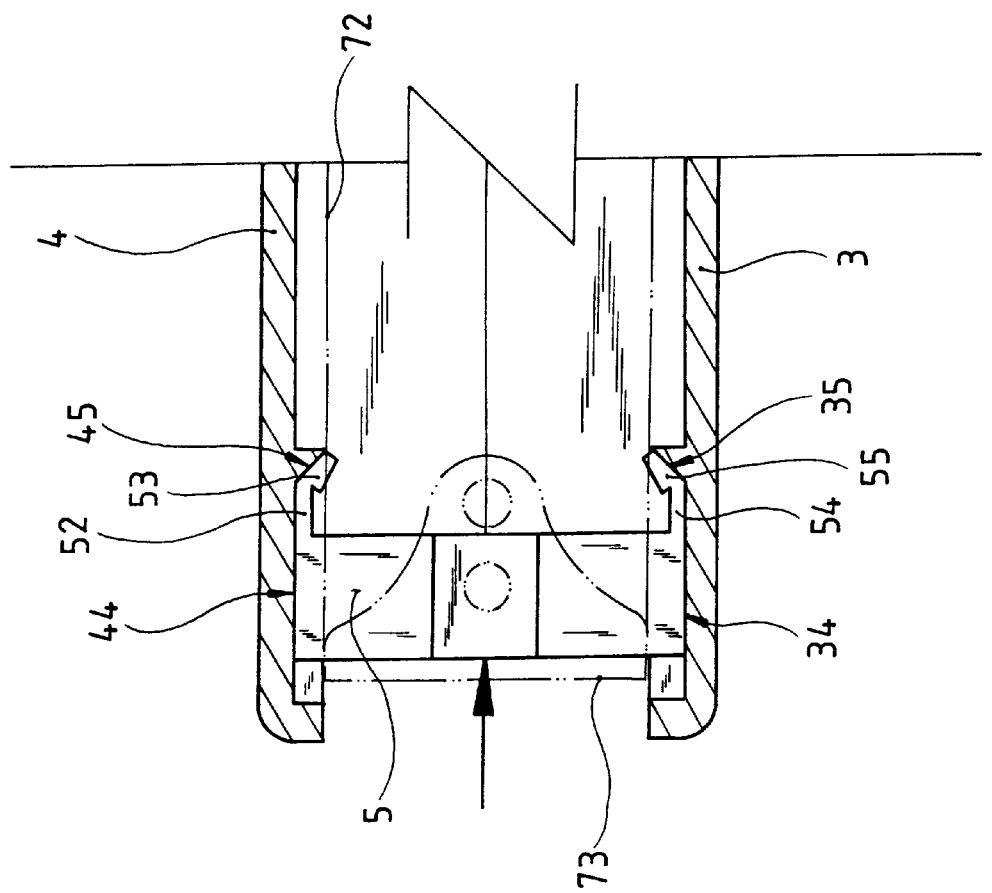

Referring to FIG. 3 and FIG. 4, the tape rule blade arrestor device of the invention herein is comprised of a right case half 3, a left case half 4, a bumper lock 5, a tape reel 7, and other components, of which:

The left case half 4 consists of a single piece of molded plastic, and protruding from the middle interior section of the said left case half 4 is a center shaft 41 and, further more, protruding from the front and rear ends, respectively, of the lower interior edge are the mounting posts 42 and 43; there is an insertion slot 44 at the bottom end of the said mounting post 42 and, furthermore, along the interior of the said insertion slot 44 is an angled surface 45 (refer to FIG. 6 and FIG. 7).

The right case half 3 consists of a single piece of molded plastic, and formed in the said right case half 3 are the three screw holes 31, 32, and 3; there is an insertion slot 34 inside the bottom end of the said screw hole 32 and, furthermore, along the interior of the said insertion slot 34 is an angled surface 35 (refer to FIG. 6 and FIG. 7).

The said tape reel 7 consists of a center-wound spiral spring 71, a ruler blade 72 wound around the exterior, and a hook 73 riveted to the front end of the ruler blade 72.

Figure 5:
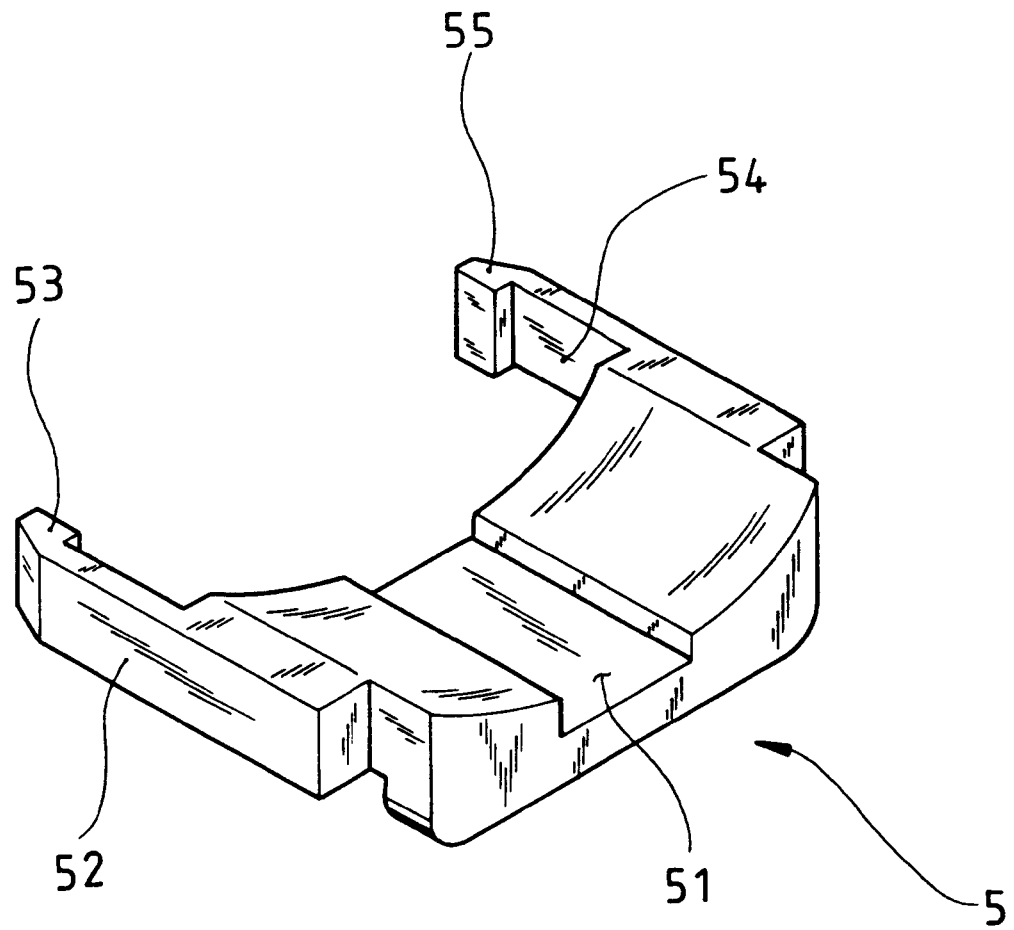
FIG. 5 is an isometric drawing of the bumper block 5 of the invention herein.

Referring to FIG. 5, the bumper block 5 consists of a single piece of molded plastic having a concave planar top surface and, furthermore, with a rectangular-shaped channel 51 formed along the center; there is a tensile bumper element 52 on one side of the said bumper block 5 and at the end section of the said bumper element 52 is a slant-surfaced protruding block 53 and, furthermore, there is a resilient bumper element 54 on the other side of the said bumper block 5 and at the end section of the said bumper element 54 is a slant-surfaced protruding block 55.

To fully assemble the tape rule 20 of the invention herein, the center section of the spiral spring 71 on the tape reel 7 is inserted over the center shaft 41 of the left case half 4 and the front end at the top wound layer of the ruler blade 72 is positioned in the bumper block 5, which is secured inside the insertion slot 44 at the bottom section and front end of the left case half 4, with the other side of the said bumper block 5 secured inside the insertion slot 34 at the bottom section and front end of the right case half 3; one each of the three screws 6 is inserted into the screw holes 31, 32, and 33 in the said right case half 3 and then fastened tightly into the center shaft 41 and the mounting posts 42 and 43 of the left case half 4.

EMBODIMENTS OF THE INVENTION

Referring to FIG. 6 and FIG. 7, the tape rule blade arrestor device of the invention herein is utilized by pulling out the said ruler blade 72 and when the user is finished and releases the ruler blade 72, since the tensile spiral spring 71 of the tape reel 7 is capable of automatically rewinding the ruler blade 72 with great force, as the ruler blade 72 recedes inward (the direction of which is indicated by the arrowhead in FIG. 6), and before the hook 73 has impacted the bumper block 5, the protruding blocks 53 and 55 of the bumper elements 52 and 54, respectively, are disengaged from the angled surface 45 in the insertion slot 44 on the left case half 4 as well as the angled surface 35 in the insertion slot 34 on the right case half 3, but when the hook 73 impacts the bumper block 5 (as indicated in FIG. 7), the angled surfaces 45 and 35 formed on the protruding blocks 53 and 55 of the said bumper elements 52 and 54, respectively, are designed to achieve excellent cushioning and arresting performance.

In summation of the foregoing section, the invention effectively improves upon the shortcomings of the conventional product and in terms of application is genuinely an original innovation compared to similar type products and, furthermore, is of greater utilitarian performance. Since the disclosed structure is capable of achieving the claimed objectives, the invention herein is submitted to the examination committee for review in application for the granting of the commensurate patent rights.

What is claimed:

1. A tape rule with a blade arrestor device comprising:
   a ruler blade,
   a bumper block,
   a spring biased tape reel, and
   a housing comprising a first case half and a second case half, said housing encloses said ruler blade, said bumper block, and said spring biased tape reel; wherein
   said bumper block comprises a main body with a concave top surface, a pair of resilient bumper elements project from sides of said bumper block, and a slanting end block protrudes from a distal end of each of said bumper elements, and
   a forward portion of said housing comprises a bumper block compartment to receive said bumper block, a rear side of said bumper block compartment includes an angled surface, and a length of said bumper block compartment is greater than a length of said bumper block so that said bumper block slides forward and backward within said bumper block compartment; such that
   said ruler blade rests on said top surface of said bumper block so that friction between said ruler blade and said top surface of said bumper block causes said bumper block to move to a position where said bumper block abuts a front wall of said bumper block compartment when said ruler blade is extended, and
   when said ruler blade is retracted, friction between said ruler blade and said top surface of said bumper block slows a travel speed of said ruler blade and causes said bumper block to move toward said rear side of said bumper block compartment, said slanting end blocks of said resilient bumper elements turning inward upon contact with said angled surface of said rear side of said bumper block compartment, thereby absorbing shock of a hook of said ruler blade contacting a front side of said bumper block.

* * * * *